United States Patent [19]

Meynard et al.

[11] Patent Number: 5,706,188
[45] Date of Patent: Jan. 6, 1998

[54] ELECTRONIC CIRCUIT FOR CONVERTING ELECTRICAL ENERGY

[75] Inventors: Thierry Meynard, Toulouse; Jean-Paul Lavieville, Gif Sur Yvette; Philippe Carrere, Toulouse; Juan Gonzalez, St Arnoult en Yvelines; Olivier Bethoux, St Germain les Arpajon, all of France

[73] Assignee: GEC Alsthom Transport SA, Paris, France

[21] Appl. No.: 727,546

[22] PCT Filed: Mar. 6, 1996

[86] PCT No.: PCT/FR96/00348

§ 371 Date: Oct. 23, 1996

§ 102(e) Date: Oct. 23, 1996

[87] PCT Pub. No.: WO96/28881

PCT Pub. Date: Sep. 19, 1996

[30] Foreign Application Priority Data

Mar. 10, 1995 [FR] France .................. 95 02818

[51] Int. Cl.$^6$ .............................................. H02M 3/18
[52] U.S. Cl. ........................... 363/59; 363/60; 307/110
[58] Field of Search ...................... 363/59, 60; 307/109, 307/110; 257/299

[56] References Cited

U.S. PATENT DOCUMENTS

| 5,132,895 | 7/1992 | Kase | 363/60 |
| 5,345,376 | 9/1994 | Nourbakhsh | 363/62 |

FOREIGN PATENT DOCUMENTS

WO9302501 2/1993 WIPO.

Primary Examiner—Peter S. Wong
Assistant Examiner—Shawn Riley
Attorney, Agent, or Firm—Sughrue, Mion, Zinn, Macpeak & Seas, PLLC

[57] ABSTRACT

A multilevel converter including, in particular, a capacitor (C1, C2, ..., Cn) for each of its cells, and control means comprising means (VMO1, VMO2, ..., VMOn) for evaluating the mean voltage across the terminals of each of the capacitors (C1, C2, ..., Cn), means (VE1, VE2, ..., VEn) for measuring any difference on each of said capacitors (C1, C2, ..., Cn) between the evaluated mean charge voltage and the nominal mean charge voltage of the capacitor, and additional control means (MCC1, MCC2, ..., MCCn) changing the duration of said first conduction state of the cell associated with said capacitor in a direction such that the measured difference is reduced.

8 Claims, 4 Drawing Sheets

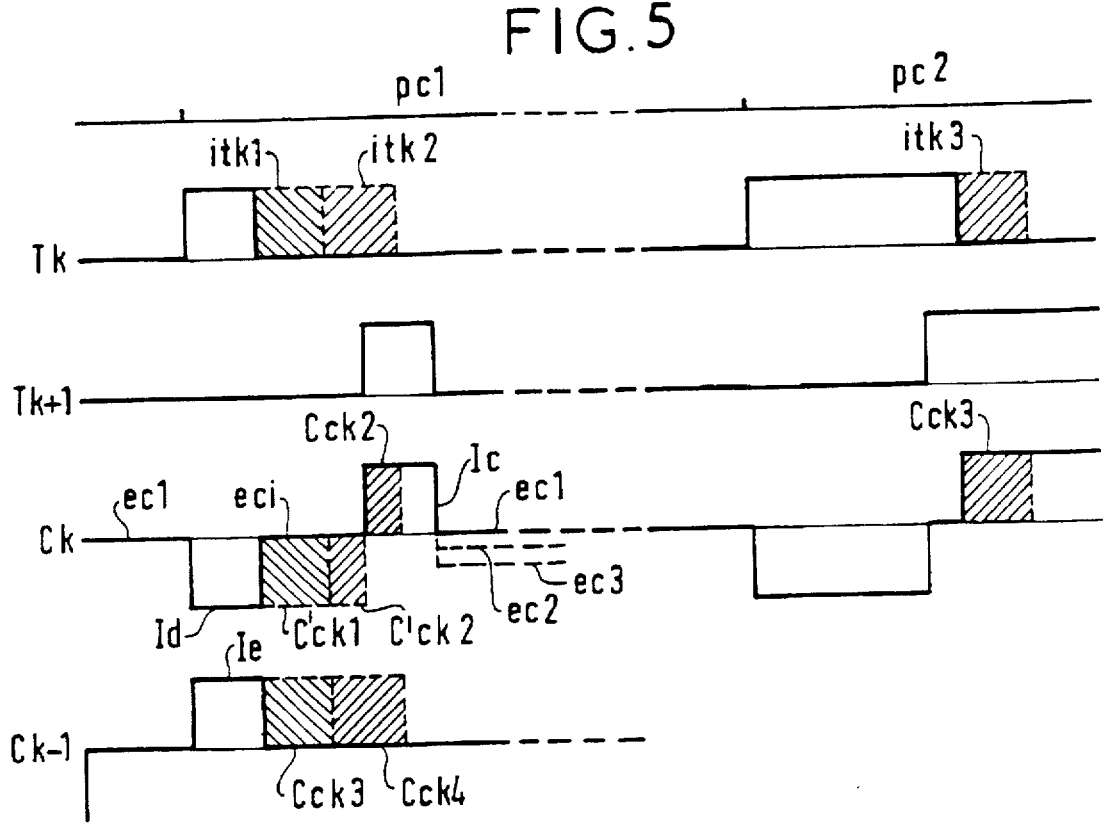
FIG. 5
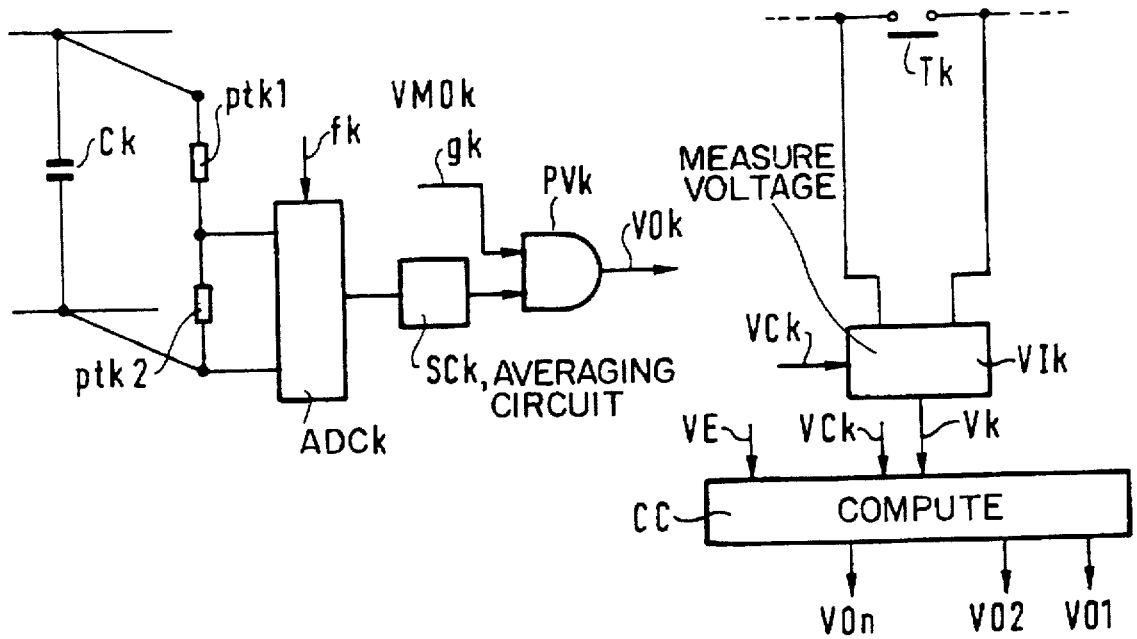
FIG. 6
FIG. 7

ELECTRONIC CIRCUIT FOR CONVERTING ELECTRICAL ENERGY

BACKGROUND OF THE INVENTION

The present invention relates to electronic circuits for converting electrical energy of the type described in French patent application FR 2 679 715 A1, and to a power supply installation making use thereof.

The converter described in that patent application is shown, by way of example, in accompanying FIG. 1. It essentially comprises, between a voltage source SE and a current source C, a succession of controllable switching cells CL1, CL2, . . . , CLn, each having two switches T1, T'1; T2, T'2; . . . ; Tn, T'n, with one pole of each of the two switches forming part of a pair of upstream poles and the other pole of each of the switches forming part of a pair of downstream poles, the pair of downstream poles of an upstream cell being connected to the pair of upstream poles of a downstream cell, and the pair of upstream poles of a first cell CL1 being connected to said current source C, while the pair of downstream poles of a last cell CLn is connected to said voltage source SE, the converter also comprising a respective capacitor C1, C2, . . . , Cn for each cell, except that the capacitor of the last cell may be omitted when said voltage source SE is suitable for performing the same role, each capacitor being connected between the two poles constituting the pair of downstream poles of its cell, the converter further having control means (not shown) governing the nominal operation of the converter and acting on the switches of the successive cells in such a manner that the two switches of any one cell are always in respective opposite conduction states (represented by control links such as lc1), such that in response to a cell control signal delivered by said control means, one of the two switches in a given cell is successively in a first conduction state and then in a second conduction state during a cyclically repeated converter period, and such that in response to cell control signals that are identical but offset in time by a fraction of said converter period, the switches of successive cells function respectively in the same manner but offset in time by said fraction of a period.

Preferably, said fraction of a period is equal to the reciprocal of the number n of cells, i.e. $2\pi/n$, which is optimal with respect to harmonics generated on the output and which enables the voltages charged on the capacitors of the converter to be balanced naturally. Some other offset is nevertheless conceivable, as are different offsets between the various stages.

In such a converter, the successive capacitors C1, C2, . . ., Cn have respective increasing mean charge voltages, the mean charge voltage of the capacitor associated with each of said cells being equal to the product of a voltage VE delivered by said voltage source SE multiplied by the reciprocal of the number of cells in the converter and by the rank of the cell, i.e. VE/3, 2VE/3, VE when n=3, i.e. when the converter has only three cells.

Naturally, the above applies to other values of n, providing n is not less than two, and in particular when n is greater than three.

The term "multilevel converter" is used below to designate a converter that satisfies the above description.

The object of the present invention is to make provision in such a multilevel converter for the charge on each capacitor to remain in compliance with the above description, in spite of inevitable departures from nominal operating conditions.

To examine more easily how the charge ought nominally to vary on one of the capacitors of a multilevel converter as described above, reference is made to FIG. 2 which shows an arbitrary switching cell CLk together with its switches Tk and T'k, the capacitor Ck associated with the cell, and also the following cell CLk+1 and its switches Tk+1, T'k+1.

Given the coupling between the switches within each cell, Tk and T'k or Tk+1 and T'k+1, the set of two adjacent cells CLk and CLk+1 shown in FIG. 2 has four states:

a) a first state where Tk and Tk+1 are non-conducting, so the charge voltage on Ck does not change;

b) a second state where Tk and Tk+1 are both conducting, so the charge voltage on Ck does not change either, since under those circumstances T'k and T'k+1 are non-conducting;

c) a third state where Tk is conducting and Tk+1 is non-conducting, in which case the current source C forces a current Ik which is equal to I to flow through Tk while the current I'k through T'k is zero. It is the state of Tk+1 that forces the current Ik+1 to be zero, while the current I'k+1 is equal to I so the current I'ck through the capacitor Ck is equal to I; and d) a fourth state where Tk is non-conducting and Tk+1 is conducting, so the current source C forces a current I'k+1 equal to I through T'k while the current Ik through Tk is zero. The state of Tk+1 forces a current Ik+1 to be equal to I, while the current I'k+1 is zero, so the current Ick through the capacitor Ck is equal to I.

The currents I'ck=I'k+1 and Ick=Ik+1 deliver additional charge of opposite signs to the capacitor Ck in the above third and fourth states; the first situation is said to be negative and the second positive. The currents corresponding to these two states are forced by the current source. If the current source forces an exactly accurate DC, and everything else remains equal, then the currents forced by the current source during stages c) and d) are the same and in opposite directions at all times throughout the conduction periods of Tk and Tk+1 (which are nominally equal and offset in time, as mentioned above). This means that the charge on Ck is changed positively and then negatively by equal amounts, so it does not vary over one period of the converter.

In an ideal system (accurate current source, infinite impedance), the currents Ick and I'ck are determined by the current source. In more practical terms, when the impedance of the current source is not infinite, the current through the current source depends on the voltage across its terminals and thus on the voltages Vck on the capacitors. For example, if it should happen that the charge voltage Vck is too high compared with its nominal value VE.k/n, for whatever reason, then there will result a discharging current I'ck tending to be greater and a charging current Ick tending to be smaller than they ought to be nominally, thereby tending to return the charge on the capacitor Ck to the value it ought to have. This explains that the operation of the multilevel converter is stable and can accommodate variations in amplitude, in either direction, both at the voltage source and at the current source. It is explained below that this nevertheless gives rise to problems in dynamic terms.

FIG. 3 is an example of operation of the multilevel converter of FIGS. 1 and 2 for a situation when n=3; pulse width modulation (PWM) type control is applied in order to deliver a sinusoidally modulated alternating voltage to the current source C, i.e., during successive periods p1, p2, p3, . . . in the operation of the converter (line t), the switches T1, T2, and T3 are successively conductive during time intervals that vary in accordance with a wave for modulating the output voltage, referred to below as the "modulating" wave. At each instant, the corresponding switches T'1, T'2, and T'3 are in the opposite positions.

Naturally, other modes of modulating the operation of the switches make it possible to obtain the same result, as is well known. Also clearly, the converter may also serve to deliver the current source C with any other waveform or with a regulated DC voltage.

Consideration is given initially to the period p1 in the operation of the converter. During this period, while any one of the switches T1, T2, and T3 is conducting, the other two are non-conducting. For each set of two cells and the capacitor between them, this corresponds to above-described states c) and d), in which the capacitor receives successive additional negative and positive charge, with the total value thereof being nominally zero. It should also be observed that while the adjacent cells CL1 and CL2 are in state d), adjacent cells CL2 and CL3 are in state c) such that capacitor C1 receives additional positive charge from the same current that provides additional negative charge to capacitor C2.

FIG. 3 also shows, by way of example, how the multilevel converter operates during periods p2, p3, etc. . . . , during which the conduction periods of the switches become shorter, and then become longer until they exceed one-third of a period, in which case they overlap. Line VI shows the voltage that would ideally be transmitted to the current source, in particular if the capacitance of the capacitors was such that the additional charge in question did not significantly alter the voltage across their terminals. The voltage VI is expressed in fractions of the voltage VE from the voltage source SE, taking the negative pole of the voltage source SE as the voltage reference. It can then be seen that this voltage VI contains both a large fundamental at the frequency of the modulating wave, and also lower-amplitude harmonics at frequencies higher than the chopper frequency which are easily eliminated by a low-pass filter. Since the current is variable, integrating it by means of an arbitrary inductive element contained in the current source results in the converter supplying the current source with an AC of sinusoidal appearance having a period that is equal to the period of the fundamental of the output voltage.

Since the current varies sinusoidally, states c) and d) mentioned above will not convey equal additional amounts of charge to the capacitors of the converter, since between the above two states, the current will have had time to vary. Such variation is negligible only if the operating period of the switches is significantly greater than the frequency of the modulating wave.

It should also be expected that the AC supplied to the current source will not be exactly sinusoidal, but will be distorted in an asymmetrical manner. Likewise, errors in the levels of the control signals or in the signals they generate, or indeed differences in the switching times of the various switches involved, inevitably cause switch conduction durations to be unequal over an operating period of the converter, or will shift the conduction stages of the switches in time, or else will unbalance the currents charging and discharging the capacitors. Consequently, and in general, it is not possible in practice with a multilevel converter of the type described to guarantee that nominal operating conditions as described initially will, in fact be satisfied. Unfortunately, a persistent error in additional charge will lead to an error in one direction or the other in the charge on a capacitor, and thus to an error in its mean charge voltage, thereby giving rise to distortion at the operating frequency of the converter in the voltage delivered to the current source.

This effect is illustrated by trace VT in FIG. 3 which is similar to the trace VI with the exception that capacitor C1 (FIG. 1) which is assumed to be charged to a voltage that is smaller than its nominal charge voltage prevents the converter from delivering pulses vi1, vi2, vi3 of constant amplitude, with the converter supplying instead, pulses such as vi1' that are of smaller amplitude (the scale is exaggerated to make it more readable) whenever the capacitor C1 is delivering its own charge voltage to the current source C, and pulses such as vi2' of greater amplitude whenever the capacitor C1 is subtracting its own voltage from the voltage delivered to the current source C, and finally also pulses such vi3' of unchanged amplitude whenever the capacitor C1 is not in the circuit. It is thus easy to see that this introduces into the signal VT a disturbing component at said chopper frequency of the converter.

Such a disturbing component does not exist when the capacitors are charged to their respective nominal voltages. When such a component appears, it is generally harmful.

However, and above all, the voltages to which the switches are subjected are no longer substantially equal to the differences between the nominal charge voltages of two adjacent capacitors, i.e. the voltage of the voltage source divided by the number of stages in the converter. This can put the switches in danger.

Naturally, and as mentioned above, errors in charge on the capacitors tend spontaneously to be reabsorbed, but that process takes time.

In addition, the spontaneous process is implemented via the current source. It therefore cannot have effect when the current source is not forcing a current, and in any event it will be slowed down whenever the current flowing through the current source is small.

SUMMARY OF THE INVENTION

On the basis of the above observations, the present invention proposes a multilevel converter in which the mean charge on each capacitor of the converter is better maintained at its nominal value.

According to the invention, the multilevel converter includes means for measuring any difference on each of said capacitors between the evaluated mean charge voltage and the nominal mean charge voltage of the capacitor, and additional control means changing the duration of said first conduction state of the cell associated with said capacitor in a direction such that the measured difference is reduced.

In an embodiment of the invention, each of the difference-measuring means includes means for receiving the value of the voltage of the voltage source, a modulation magnitude determining a voltage waveform to be applied to said current source, the rank of the stage and the number of stages, so as to determine what the nominal charge voltage of each capacitor consequently ought to be in an operating period of the converter, said difference then being measured on each capacitor of the converter by comparator means subtracting said mean voltage evaluated across the terminals of each capacitor from said nominal charge voltage of the capacitors.

In a first embodiment of the invention, said means for evaluating the voltage across the terminals of each capacitor comprise a voltmeter network connected across the two terminals of the capacitor.

In a variant, said means for evaluating the voltage across the terminals of each capacitor comprise a voltmeter network connected across the two terminals of a switch in each cell.

In another variant, said means for evaluating the voltage across the terminals of each capacitor comprise a voltmeter network connected across the two terminals of the current source.

Preferably, each of said additional control means receives, in addition to said difference signal, a measurement of the current I forced by said current source and a constant expressing the capacitance of one of said capacitors that is associated with it, and computes accordingly a change in the duration of said first conduction state of the cell associated with the capacitor, which change is such that it generates charge in the capacitor compensating for said charge difference.

Also preferably, each of said additional control means also receives a modulation signal, and changes accordingly the duration of said first conduction state of the cell associated with the capacitor, so that, with all of said additional control means acting likewise, said current source receives a mean voltage modulated according to said modulation signal.

Preferably again, each of said additional control means receives from an adjacent additional control means a change signal established therein and defining a change that the adjacent additional control means makes to said duration of said first conduction state of the cell associated with it, so that the additional control means in question changes accordingly said duration of said first conduction state of the cell specific to it, in a direction that compensates, in the capacitor associated with that cell, the effect of said change made in the adjacent cell.

BRIEF DESCRIPTION OF THE DRAWINGS

The various objects and characteristics of the present invention appear more clearly in the following description of embodiments of the invention given by way of non-limiting example and made with reference to the accompanying figures, in which:

FIG. 5 shows curves illustrating how the invention is implemented in accordance with the configuration of FIG. 4, and relating to an arbitrary multilevel converter cell, such as the cell shown in FIG. 2;

FIG. 6 is the circuit diagram of means for evaluating capacitor charge voltage and usable in the circuit of FIG. 4; and FIG. 7 is the circuit diagram of a variant of a portion of the means shown in FIG. 4, corresponding to the case when the mean charge voltage of each of the capacitors of the multilevel converter is derived from knowing the voltage across the terminals of each of the switches, when they are open.

DETAILED DESCRIPTION OF THE INVENTION

A multilevel converter is not described again. The diagrams of FIGS. 1, 2, and 3 correspond to a converter of the type described in patent document FR 2 697 715 A1, to which the reader can refer for more ample details.

Figure 1:
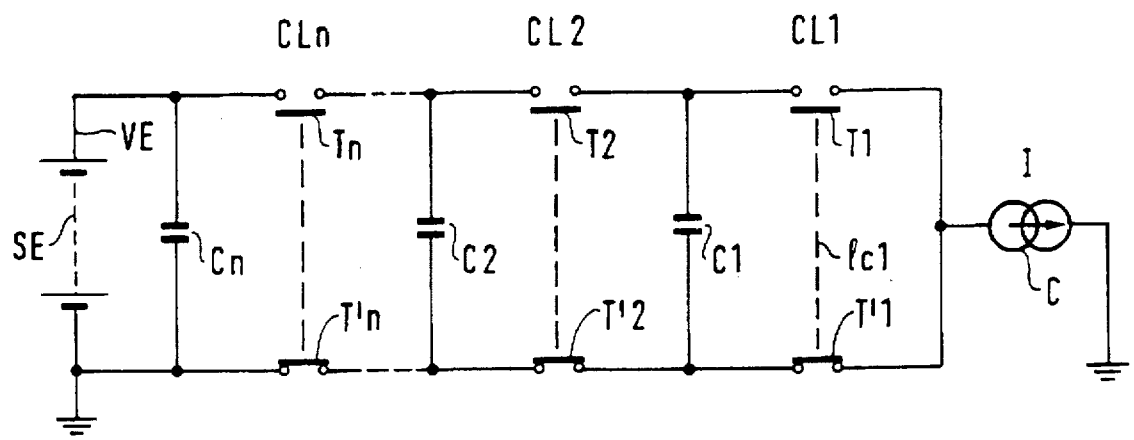
FIG. 1, described above, is the circuit diagram of a known multilevel converter.
Figure 4:
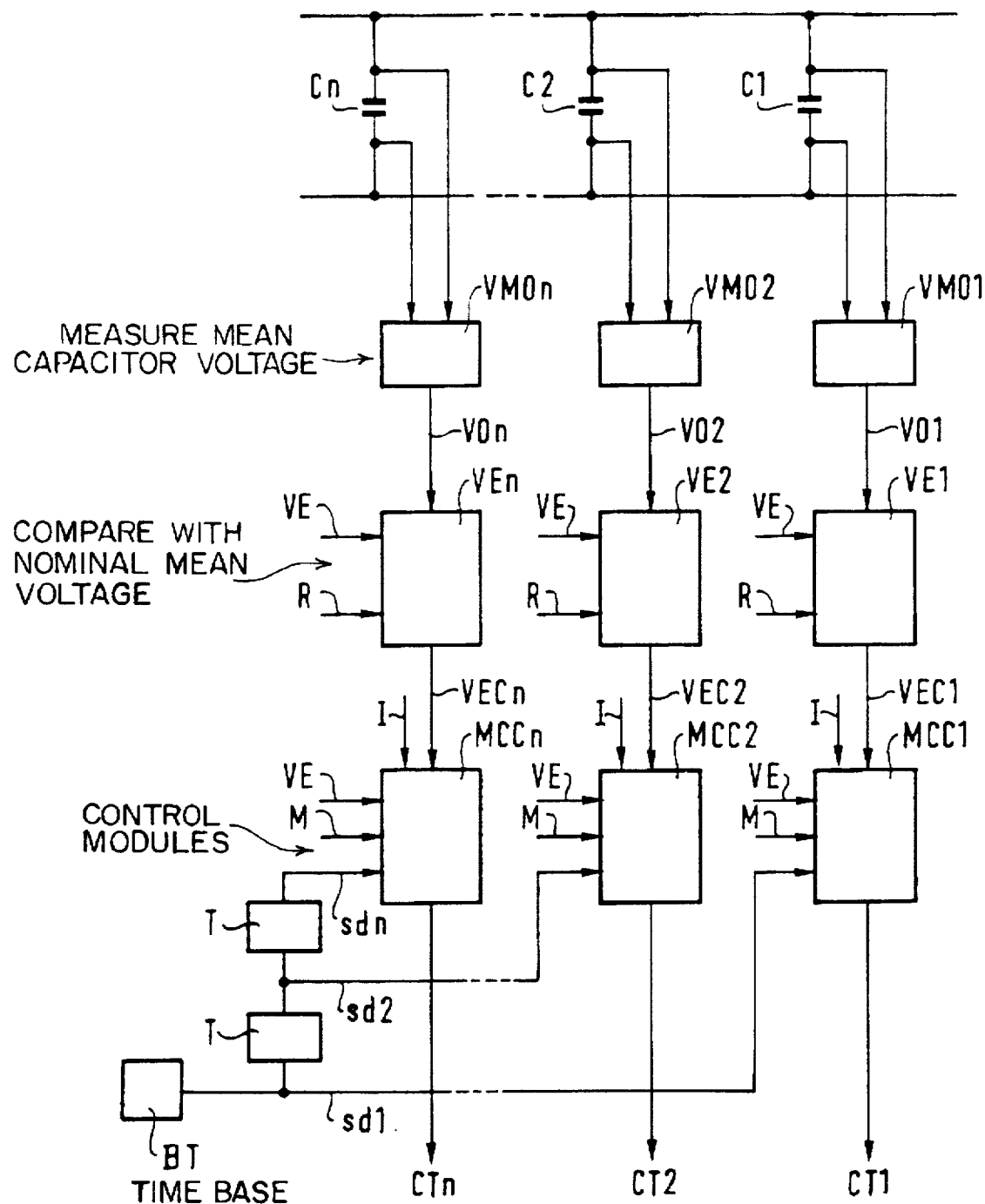
FIG. 4 is the circuit diagram of control means for a multilevel converter of the type shown in FIGS. 1, 2, and 3 and organized to enable the invention to be implemented.

In FIG. 4, only the capacitors C1, C2, ..., Cn of the FIG. 1 converter are shown.

According to the invention, each of these capacitors is associated with a respective evaluation circuit VMO1, VMO2, ..., VMOn enabling the voltage across the terminals of each of the capacitors to be evaluated. To this end, each such circuit is coupled to the two terminals of a respective capacitor, and provides an evaluation signal VO1, VO2, ..., VOn representative of the voltage that exists across the terminals of the capacitor.

According to the invention, each of the capacitors is also associated with a respective difference-measuring circuit VE1, VE2, ..., VEn measuring the difference, if any, between the observed mean charge voltage as received from the corresponding evaluation circuit and the nominal mean charge voltage of the capacitor. The difference-measuring circuit itself calculates the nominal mean charge voltage of the capacitor, which is the fraction 1/n of the voltage VE of the voltage source SE multiplied by the rank R of the stage, n being the number of stages in the converter. This circuit thus receives the value VE, while the values n and R, which are constant, are hard-wired in each circuit. The circuit derives therefrom the nominal mean charge voltage VE.R/n and compares it with the evaluated mean charge voltage to provide a difference signal VEC1, VEC2, ..., VECn representative of the difference between said two voltages.

The difference signal acts on additional control means included in control modules MCC1, MCC2, ..., MCCn. These control modules operate in response to trigger signals sd1, sd2, ..., sdn which are delivered to them on each period such as p1 (FIG. 3) by a time base BT in offset manner so as to control the switching cells of the converter in offset manner. The primary function of each of the control modules is to produce a control pulse during each period, the nominal duration of the control pulse being determined by the value M of the modulation signal. Each of said additional means in the control modules MCC1, MCC2, ..., MCCn also changes the length of the pulse as a function of the value of the difference signal VEC1, VEC2, ..., VECn, and of the current I forced by the current source. Each of said additional means in the control modules MCC1, MCC2, ..., MCCn finally preferably changes the length of the pulse as a function of the change made to its own control pulse by an adjacent control module and indicated to it by a change signal SM1, SM2, ..., SMn produced by each control module MCC1, MCC2, ..., MCCn. In the example shown in FIG. 4, the signal SM1 is produced by the control module MCC2, the signal SM2 is produced by a module MCC3 (not shown). Signal SMn is mentioned for reasons of uniformity for control module MCCn, but it does not exist insofar as there is no control module MCCn+1. The resulting signals CT1, CT2, ..., CTn control the states of the switches in the corresponding switching cells CL1, CL2, ..., CLn.

More precisely, the difference signal lengthens (or shortens) the "1" states of the corresponding switch T1, T2, ..., Tn (see FIG. 1). Such lengthening depends on the charge difference to be corrected, but also on the current through the current source I, as measured by a conventional-type current sensor inserted in series with the current source, and on the capacitance of the capacitor, which is a constant hard-wired in the control module.

It also depends on the lengthening applied to the adjacent control pulse, as explained above, namely that "capacitor C1 receives additional positive charge from the same current that provides additional negative charge to capacitor C2". Thus, for example, lengthening the control pulse CT2, which puts the switch T2 in the conducting state and which charges the capacitor C2 negatively, applies unwanted additional positive charge to the capacitor C1. This additional lengthening is therefore indicated to the control module MCC1 by the signal SM1 which is used to correct the control signal CT1 in a direction such that the above-mentioned unwanted additional positive charge is corrected.

Naturally, the directions of such step-by-step corrections are reversed if the influence of charge variations that one capacitor has on the other occurs in the other direction.

Figure 2:
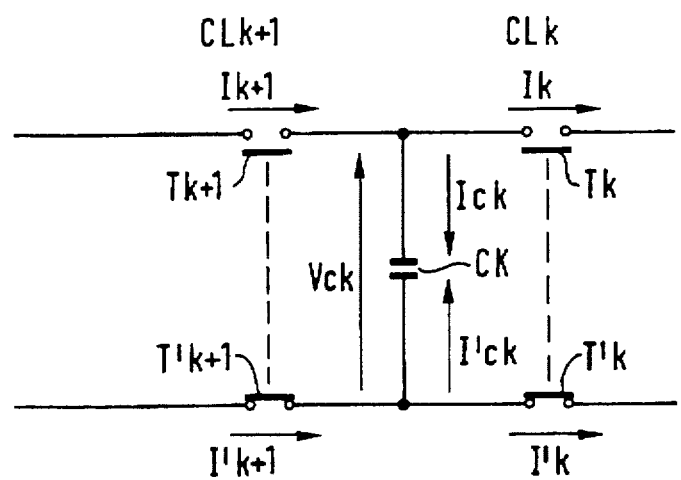
FIG. 2, described above, is the circuit diagram of a set of two adjacent stages of the multilevel converter of FIG. 1.

FIG. 5 shows two examples of operation of a set of two adjacent cells such as the cells shown in FIG. 2, for the current directions shown in FIG. 2, and shows charging and discharging of a capacitor Ck from the curves Ik and Vck representing the current flowing through the capacitor and the voltage across its terminals. Likewise, FIG. 5 shows operation of the switches Tk and Tk+1 in the cells CLk and CLk+1.

In the converter operating period pc1, the nominal pulses for closing the switches Tk and Tk+1 occur successively without overlapping. As explained above, pulse Tk supplies a current pulse Id which applies additional negative charge to the capacitor Ck, i.e. it discharges the capacitor. Then the pulse Tk+1 supplies a current pulse Ie which applies positive additional charge, i.e. it recharges the capacitor. The voltage Vck, initially at a level ec1, decreases during pulse Id, and then increases again during pulse Ie to reach the same level ec1.

A change applied to the length of the nominal pulse Tk is shown by the pulse being lengthened by a first correction interval itk1, and then by a second correction interval itk2.

Insofar as the correction interval itk1 is shorter than the time elapsed between the two nominal pulses Tk and Tk+1, this results in lengthening C'ck1 the discharge of the capacitor Ck for the purposes of correcting the measured difference, which is assumed to be constituted by excessive charge on the capacitor Ck. As a result, the discharging period is lengthened and there is a correlative reduction in the voltage finally observed across the terminals of the capacitor Ck, which voltage becomes ec2 which is less than ec1.

If the correction also extends over the second correction interval itk2, to the extent that the lengthened pulse Tk overlaps in part at least the pulse Tk+1, the lengthening of the discharging period covers the entire duration until the beginning of the nominal charge Tk+1. Then, since both switches are closed together, the charging of the capacitor Ck is shortened Cck2 from the beginning of the pulse Tk+1 to the instant at which the extended pulse Tk ends. As a result, the voltage across the terminals of the capacitor Ck becomes ec3, which is less than ec2. Both the lengthening of discharging and the shortening of charging thus act to reduce the excessive charge on the capacitor Ck.

Naturally, the above-described examples are given only by way of demonstration. The corrections made are of very large amplitude compared with the durations of the nominal pulses of the switches, which should not occur in practice. However, they show clearly what happens in the converter during charge difference correction, when the end of a nominal pulse Tk of a cell CLk comes close to the beginning of the nominal pulse Tk+1 of the following cell, and when lengthening the nominal pulse Tk does not cause it, or else does cause it, to overlap in part at least the nominal pulse Tk+1. It has been verified that the correction is effective in both cases.

FIG. 5 also shows, in another period pc2, the correction mechanism whereby excessive charge on the capacitor Ck is corrected, in the case when the nominal pulses Tk and Tk+1 overlap in part. Like the itk2/Cck2 pair examined above, the lengthening itk3/shortening Cck3 pair effects the desired correction.

It is easy to verify that a correction in the opposite direction, with the mean charge on the capacitor Ck being insufficient, results in a reduction in the duration of the nominal pulse Tk and an increase in the charge on the capacitor Ck.

In a variant, the charge differences in question may be corrected in a centralized control circuit performing the functions of all of the control modules MCC1, MCC2, . . . , MCCn, or in a circuit containing all of the control modules MCC1, MCC2, . . . , MCCn, together with interconnections and inter-module co-ordination means, and thus capable of computing the initial correction(s) to be made to the operation of one or more stages of the converter, as well as the corresponding subsequent corrections.

In a simple embodiment, such a circuit maintains the operating mark-space ratio of the first stage of switches, for example, and corrects any difference observed by changing the mark-space ratios of the other stages, as explained above. It is equally conceivable to maintain the operating mark-space ratio of the last stage.

Under these conditions, a person skilled in the art can easily understand that, by making an overall correction affecting all of the stages except for one, it is possible, using the mechanism described above, to adjust the last command so that the entire set of corrections has no effect on the current source, the voltage supplied to the current source remaining constant, and only the energy taken from the voltage source being changed, by increasing or reducing the energy taken, and then distributing it over the various stages by means of the above-described correction mechanism.

In the same way, the voltage supplied by the converter to the current source may be changed by modulating the charge on the capacitor of rank n-1 only, the above-described correction mechanism then bringing the charges on the capacitors of ranks n-2, . . . , 2, 1 into line accordingly.

The above-described circuit thus makes it possible to modulate the conduction durations of the switches Tk so that, at all times, the mean voltage of each capacitor Ck is as close as possible to its nominal charge voltage.

As described above, the nominal charge voltage corresponds to a fraction of the voltage VE of the voltage source (cf FIG. 1) which depends on the rank k of the stage in question.

The mean voltage of the capacitor is therefore evaluated in a manner consistent with the above, in an observation circuit VMO1, VMO2, . . . , VMOn, i.e. VMOk in general terms.

Based on the above, and with reference to FIG. 6, the observation circuit is constituted, in one embodiment, by impedances ptk1 and ptk2 connected in series across the terminals of the capacitor Ck, and delivering a determined fraction of the voltage across the terminals of the capacitor to an analog-to-digital converter ADC which functions on each pulse fkn to deliver a digital voltage value to an averaging circuit SCk which is read once per converter cycle by a gate circuit PVk which is triggered by a signal gk. The signals fk and gk are advantageously produced by a time base BT (FIG. 4) and their positions in the operating period of the converter are such that after m measurements of the voltage in the operating period of the converter, and after computation of the mean of the results of said measurement, the value for the observed mean charge voltage is made available on the output VOk of the circuit SCk, once per converter cycle, at the moment appropriate for determining, in the control modules MMC1, MMC2, ..., MMCn, the change described with reference to FIG. 4 in the duration of the appropriate conduction state (conduction of the switch Tk in the above) of the corresponding cell.

Naturally, the observed mean charge on the capacitor Ck may be obtained by other means.

In a first variant, shown in FIG. 7, instead of measuring the voltage across the terminals of the capacitor Ck, the voltage VE of the voltage source is measured as is the voltage across the terminals of one of the switches in each cell, so as to establish, by subtraction, and step-by-step, the mean charge voltage of each of the capacitors of the multilevel converter. FIG. 7 shows one of the switches Tk of the FIG. 1 multilevel converter, to which switch a voltage evaluation circuit VIk is coupled. The voltage evaluation circuit may be as shown in FIG. 6, subject to being adapted by a person skilled in the art, and it supplies a signal Vk representative of the voltage across the terminals of the switch Tk to a computation circuit CC at the same time as the computation circuit receives the control signal VCk controlling the switch Tk, which makes it possible for the computation circuit to taken into consideration only the values supplied by the evaluation circuit VIk during the periods in which the switch is not conducting. The computation circuit receives the voltage VE directly, which voltage may also be obtained by a circuit such as the FIG. 6 circuit, appropriately simplified, and it effects the subtraction that supplies the signals VO1, VO2, ..., VOn of FIG. 4.

Figure 3:
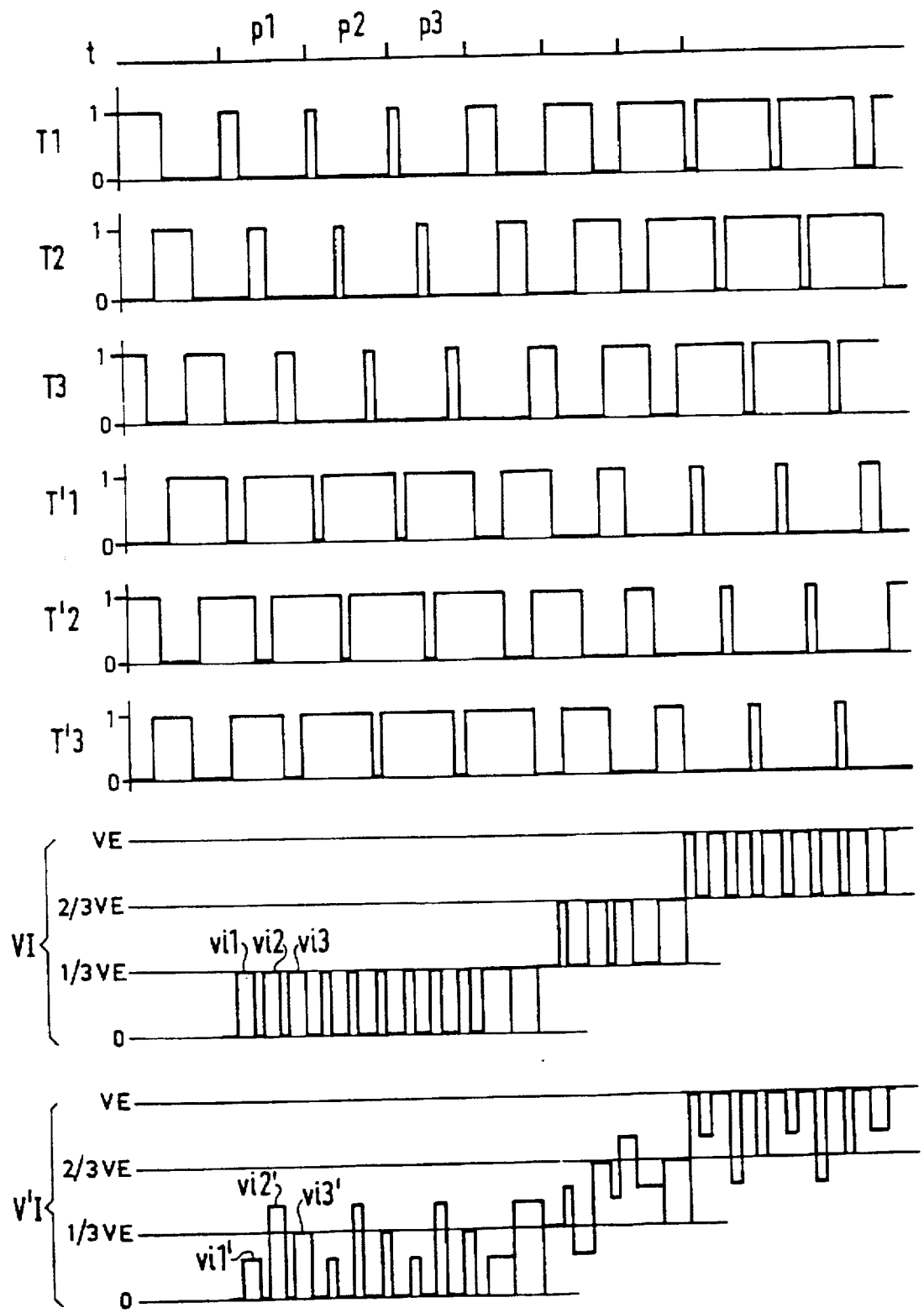
FIG. 3, described above, is a waveform diagram showing operation of the multilevel converter of FIGS. 1 and 2, for the case where it comprises three stages.

In another variant, which can be deduced easily from FIG. 3, the amplitude measurement of the pulses delivered to the current source I represents the voltage across the terminals of the capacitor that generated them. A single circuit such as the FIG. 6 circuit connected to the terminals of the current source C, and evaluating the voltage at different points along the curve VI of FIG. 3, during each period, such as 21, sees the levels vi1, vi2, vi3 output by each of the capacitors. A person skilled in the art can easily understand how it is possible to derive therefrom the signals VO1, VO2, ..., VOn shown in FIG. 3 representing the evaluated mean charge of each of the capacitors of the multilevel converter.

Naturally, the above descriptions are given purely by way of non-limiting example, and the numerical values, in particular, can change with each application.

We claim:

1. A multilevel converter comprising, in particular, between a voltage source (SE) and a current source (C), a succession of controllable switching cells (CL1, CL2, ..., CLn), each having two switches (T1, T'1; T2, T'2; ...; Tn, T'n), with one pole of each of the two switches forming part of a pair of upstream poles and the other pole of each of the switches forming part of a pair of downstream poles, the pair of downstream poles of an upstream cell being connected to the pair of upstream poles of a downstream cell, and the pair of upstream poles of a first cell (CL1) being connected to said current source (C), while the pair of downstream poles of a last cell (CLn) is connected to said voltage source (SE), the converter also comprising a respective capacitor (C1, C2, ..., Cn) for each cell, except that the capacitor of the last cell may be omitted when said voltage source (SE) is suitable for performing the same role, each capacitor being connected between the two poles constituting the pair of downstream poles of its cell, the converter also comprising control means governing the nominal operation of the converter and acting on the switches of the successive cells in such a manner that the two switches of any one cell are always in respective opposite conduction states, such that in response to a cell control signal (CT1, CT2, ..., CTn) delivered by said control means, one of the two switches in a given cell is successively in a first conduction state and then in a second conduction state during a cyclically repeated converter period, and such that in response to cell control signals that are identical but offset in time by a fraction of said period, the switches of successive cells function respectively in the same manner but offset in time by said fraction of a period, the successive capacitors (C1, C2, ..., Cn) having respective increasing nominal means charge voltages, the nominal mean charge voltage of the capacitor in each of said cells being equal to the product of a voltage (VE) from said voltage source (SE) multiplied by the reciprocal of the number of cells and by the rank of the cell, the converter being characterized in that it includes means (VMO1, VMO2, ..., VMOn) for evaluating the mean voltage across the terminals of each of the capacitors (C1, C2, ..., Cn), means (VE1, VE2, ..., VEn) for measuring any difference on each of said capacitors (C1, C2, ..., Cn) between the evaluated mean charge voltage and the nominal mean charge voltage of the capacitor, and additional control means (MCC1, MCC2, ..., MCCn) changing the duration of said first conduction state of the cell associated with said capacitor in a direction such that the measured difference is reduced.

2. A multilevel converter according to claim 1, characterized in that each of the difference-measuring means (VE1, VE2, ..., VEn) includes means for receiving the value of the voltage (VE) of the voltage source (SE), the rank of the stage (R) and the number of stages (n) so as to determine what the nominal charge voltage of each capacitor consequently ought to be in an operating period of the converter, said difference (VE1, VE2, ..., VEn) then being measured on each capacitor of the converter by comparator means subtracting said mean voltage evaluated across the terminals of each capacitor from said nominal charge voltage.

3. A multilevel converter according to claim 2, characterized in that said means (VM1, VM2, ..., VMn) for evaluating the voltage across the terminals of each capacitor (C1, C2, ..., Cn) comprise a voltmeter network (ptk1, ptk2) connected across the two terminals of the capacitor.

4. A multilevel converter according to claim 2, characterized in that said means for evaluating the voltage across the terminals of each capacitor comprise a voltmeter network (VIk) connected across the two terminals of a switch (Tk) in each cell and a computation circuit (CC) deriving the voltage across the terminals of each capacitor from the voltage VE of the voltage source and from the voltages evaluated across the terminals of the switches separating the capacitor from the voltage source.

5. A multilevel converter according to claim 2, characterized in that said means for evaluating the voltage across the terminals of each capacitor comprise a voltmeter network connected to the current source so as to detect the effects on the output voltage of any charge differences, and a computation circuit containing a model of the converter and making it possible to evaluate the voltage across the terminals of each of the capacitors.

6. A multilevel converter according to any preceding claim, characterized in that each of said additional control means (MCC1, MCC2, ..., MCCn) receives, in addition to said difference signal (VE1, VE2, ..., VEn), a measurement of the current I forced by said current source and a constant expressing the capacitance of one of said capacitors that is associated with it, and computes accordingly a change in the duration of said first conduction state of the cell associated with the capacitor, which change is such that it generates charge in the capacitor compensating for said charge difference.

7. A multilevel converter according to claim 1, characterized in that each of said additional control means (MCC1, MCC2, . . . , MCCn) receives, in addition to said difference signal (VE1, VE2, . . . , VEn), a modulation signal M, and changes accordingly the duration of said first conduction state of the cell associated with the capacitor, so that, with all of said additional control means acting likewise, said current source receives a mean voltage modulated according to said modulation signal.

8. A multilevel converter according to claim 1, characterized in that each of said additional control means (MCC1, MCC2, . . . , MCCn) receives from an adjacent additional control means a change signal (SM1, SM2, . . . , SMn) established therein and defining a change that the adjacent additional control means makes to said duration of said first conduction state of the cell associated with it, so that the additional control means in question changes accordingly said duration of said first conduction state of the cell specific to it, in a direction that compensates, in the capacitor associated with that cell, the effect of said change made in the adjacent cell.

* * * * *